United States Patent [19]

Dolza et al.

[11] 4,195,622
[45] Apr. 1, 1980

[54] SWIMMING POOL COVER AND SOLAR HEATER

[76] Inventors: John Dolza, 810 State Rd., Fenton, Mich. 48430; Paul B. Dolza, 460 Fifth St., Montara, Calif. 94037

[21] Appl. No.: 846,512

[22] Filed: Oct. 28, 1977

[51] Int. Cl.² ............................ F24J 3/02; E04H 3/18
[52] U.S. Cl. .................................. 126/415; 4/172.2; 4/172.13; 4/172.14
[58] Field of Search ............... 126/270, 271; 4/172.12, 4/172.13, 172.14; 203/DIG. 1

[56] References Cited

U.S. PATENT DOCUMENTS

| Re. 25,078 | 11/1961 | McGuire | 4/172 |
|---|---|---|---|
| 2,815,809 | 12/1957 | Jacobs et al. | 4/172.12 |
| 2,870,455 | 1/1959 | Reeves | 220/206 X |
| 2,883,676 | 4/1959 | Kwake | 4/172 |
| 3,072,920 | 1/1963 | Yellot | 126/271 X |
| 3,077,190 | 2/1963 | Allen | 126/271 X |
| 3,148,384 | 9/1964 | Bartolucci et al. | 4/172 |
| 3,161,193 | 12/1964 | Rowekamp | 126/271 |
| 3,174,915 | 3/1965 | Edlin | 126/271 |
| 3,313,443 | 4/1967 | Dial et al. | 4/172 X |
| 3,366,977 | 2/1968 | Koehler | 4/172.12 |
| 3,520,004 | 7/1970 | Patnaude | 4/172.12 |
| 3,600,721 | 8/1971 | Pusey | 4/172.12 |
| 3,676,880 | 7/1972 | Kwake | 4/172.12 |
| 3,780,385 | 12/1973 | Dunn | 4/172.13 X |
| 3,893,443 | 7/1975 | Smith | 126/271 |
| 3,916,457 | 11/1975 | Morita | 4/172.12 |

FOREIGN PATENT DOCUMENTS

| 236337 | 10/1960 | Australia | 126/271 |
|---|---|---|---|
| 236337 | 11/1961 | Australia | 126/271 |
| 809206 | 2/1959 | United Kingdom | 4/185 F |

*Primary Examiner*—Samuel Scott
*Assistant Examiner*—Larry Jones
*Attorney, Agent, or Firm*—McGlynn and Milton

[57] ABSTRACT

A swimming pool cover having at least a portion of which is made of material allowing solar energy to pass therethrough coacts with a solar heating mat in the pool to retain heat developed by the mat. The dark-colored mat has a specific gravity sufficiently greater than that of water to allow the mat to sink to the bottom of the swimming pool. The mat is made of a pliable material and has a crossbar member to facilitate rolling of the mat so that the surface area of the mat may be varied in order to provide control of the temperature of the water. A cylindrical air sac is connected to the cover, which is made of pliable material, and is positioned adjacent an edge of the cover in order to allow rolling and unrolling of the cover and is sufficiently buoyant to support the cover in the water when the cover is in rolled and unrolled positions and during movement therebetween. In one embodiment the air sac is removably connected to the cover by fastening means while in another embodiment the air sac is integrally formed from a portion of the cover. Additionally, a plurality of air sacs and covers may be connected together. Also, the air sacs include handles to facilitate rolling and unrolling of the cover. The cover has a slack portion which allows movement of a part of the cover between a normal configuration and a cavity configuration. A stop member positioned adjacent the edge of the marginal portion of the cover is engageable with weighted members and the weighted members are engageable with an abutment member positioned on the deck of the pool after moving a predetermined distance which locks the cover in position after allowing limited movement of the cover.

20 Claims, 10 Drawing Figures

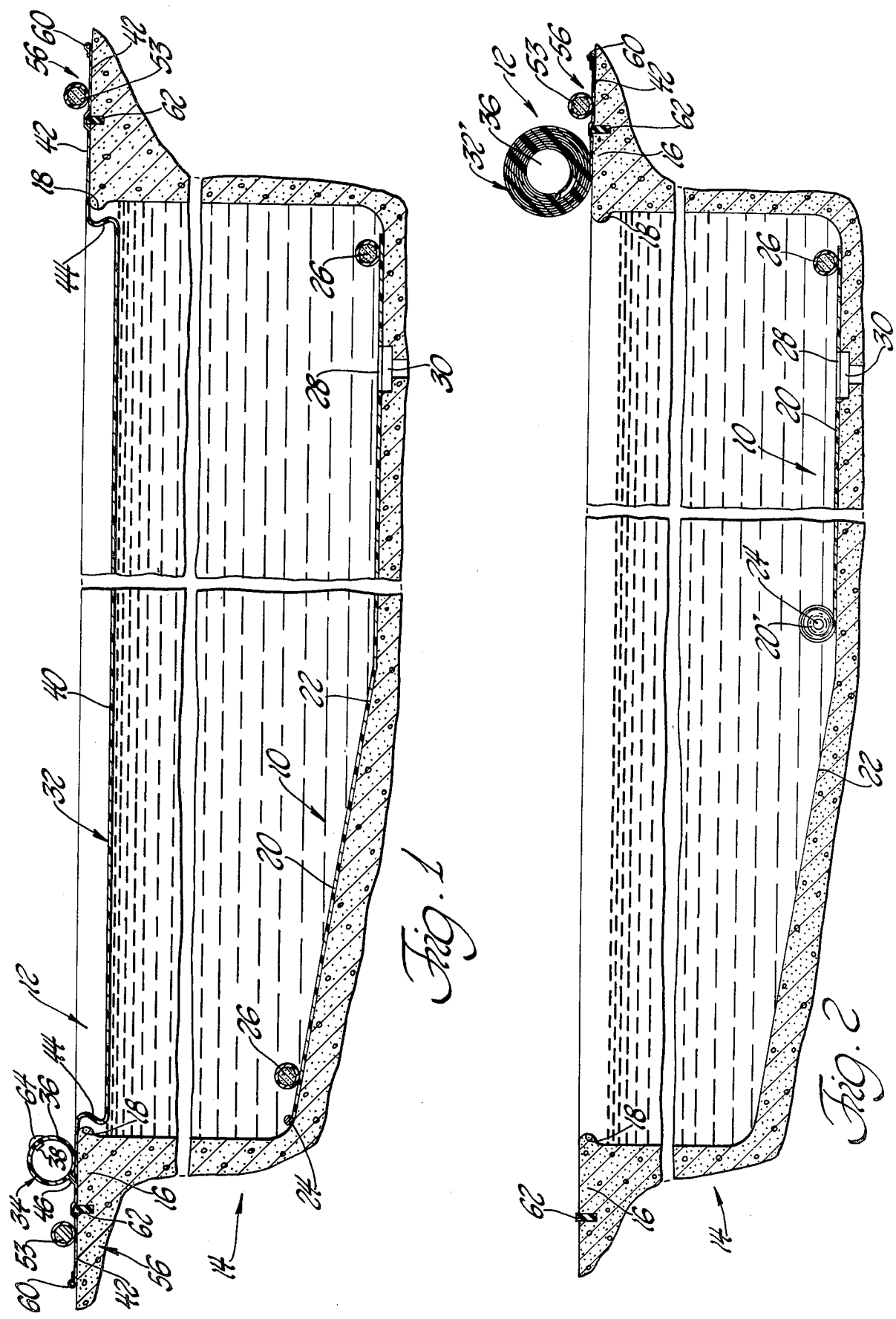

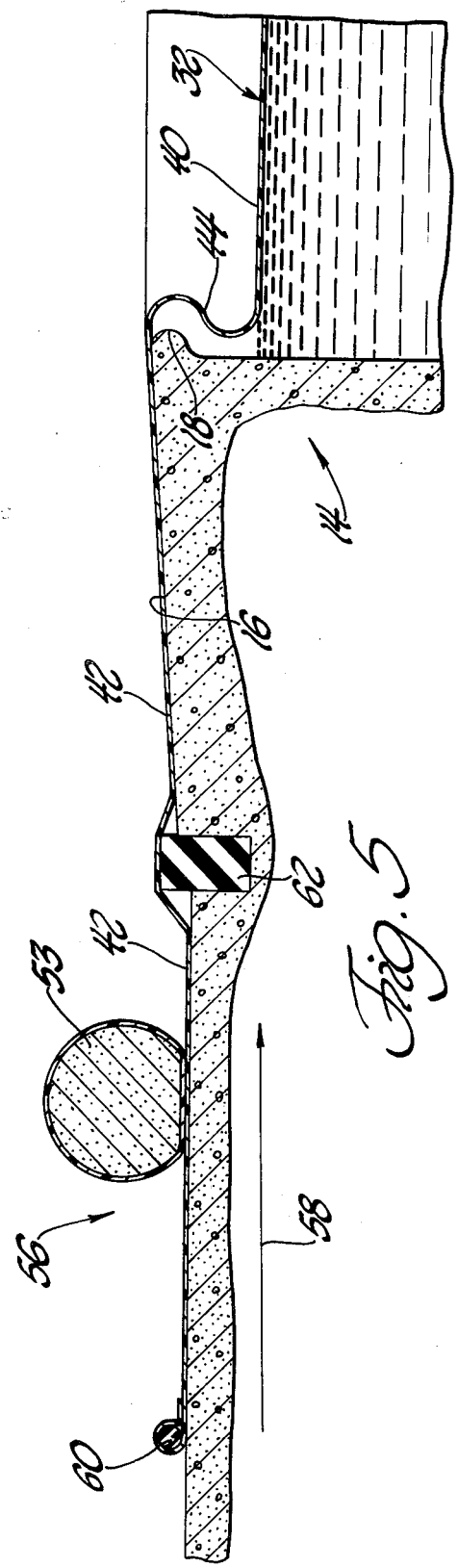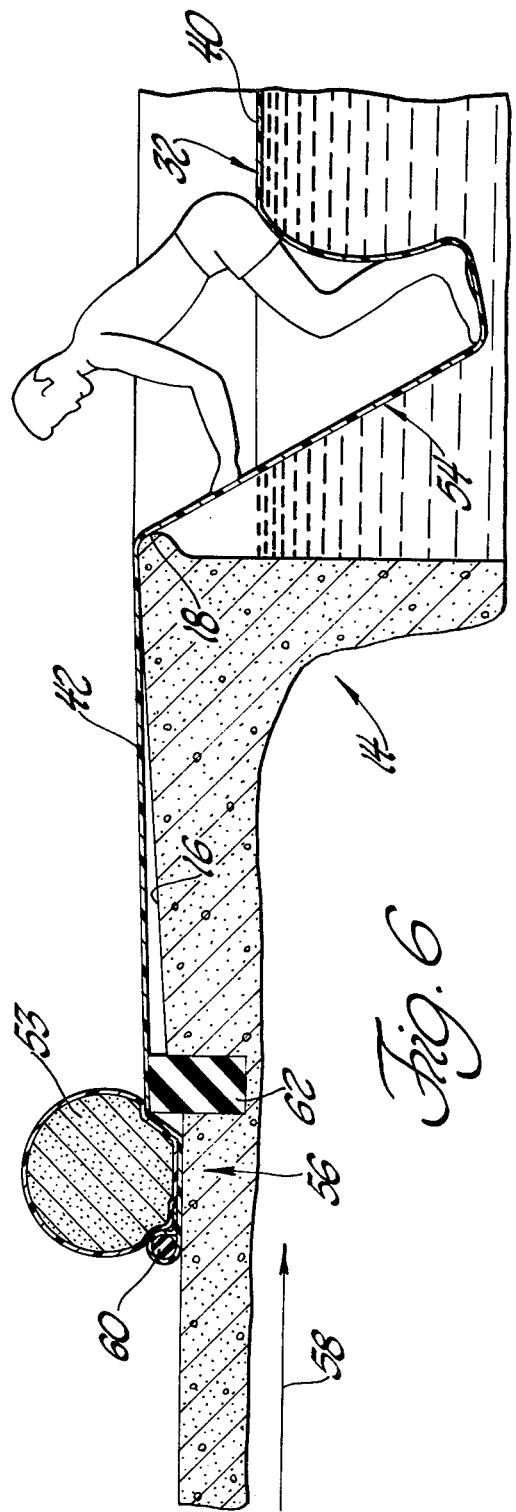

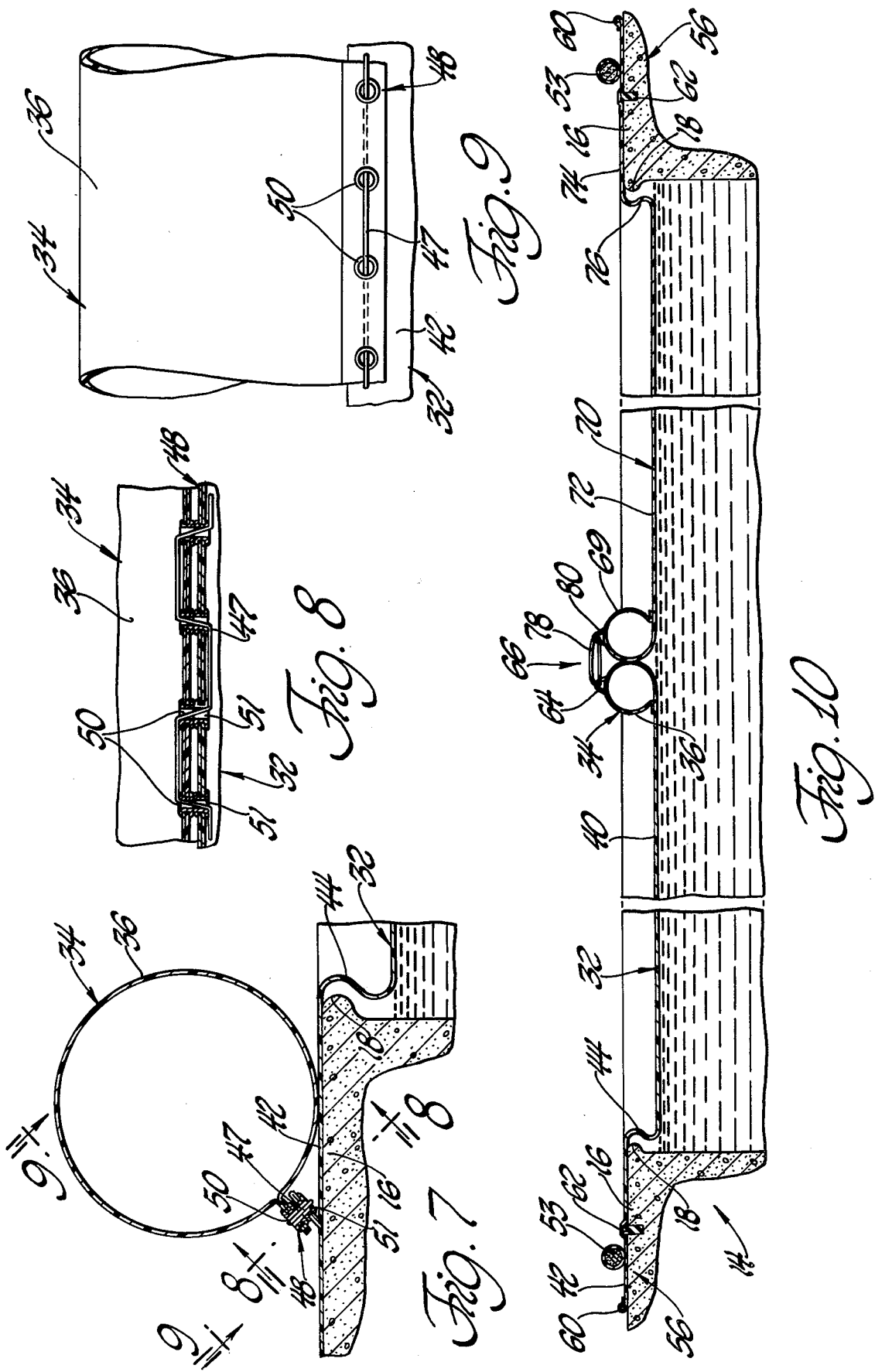

SWIMMING POOL COVER AND SOLAR HEATER

BACKGROUND OF THE INVENTION (1) Field of the Invention

The subject invention relates to an improved cover and solar heater for use with a swimming pool. To secure maximum enjoyment, especially in spring and fall seasons, some form of heater for the pool water is needed. Since solar energy is so readily available, solar heating as an expedient for providing pool water at a comfortable swimming temperature is quite advantageous. In addition the subject invention relates to swimming pool covers which prevent evaporation of water and chemicals, prevent entry of foreign materials, and give protection against drowning by a person falling into the pool. Thus, in order to encourage use of swimming pool covers, a cover should be able to be easily installed, removed and stored and provide effective protection against drowning by being adequate to provide a safe support for someone accidentally falling on the pool cover.

(2) Description of the Prior Art

Typically, the prior art solar heating assemblies for swimming pools are constructed so as to be floatable on the surface of the pool water to be heated. The typical prior art swimming pool covers can be adapted to swimming pools of various shapes and sizes but are generally quite difficult to handle during removal and installation. The prior art swimming pool covers which are rollable in order to provide relatively easy installation and removal have the operative roller mechanism located outside of a pool which is unattractive and interferes with use of the pool or are quite expensive to install.

SUMMARY OF THE INVENTION

The subject invention relates to the combination of a solar heater and a swimming pool cover. Solar energy collection means having a specific gravity greater than that of water for absorbing solar energy coacts with cover means for retaining heat developed therefrom.

In one subcombination, the solar energy collection means has a specific gravity greater than that of water for heating the water in a swimming pool and control means for controlling the temperature of the water.

In another subcombination, the swimming pool cover assembly comprises cover means made of pliable material for covering a swimming pool, and at least one floatable roller means operatively connected with said cover means and positioned adjacent an edge thereof for rolling and unrolling said cover means between rolled and unrolled positions.

In a still further subcombination, a swimming pool cover assembly comprises cover means made of pliable material for covering a swimming pool, and locking means responsive to stress in said cover means for locking said cover means in position after allowing limited movement of said cover means.

PRIOR ART STATEMENT

Solar heating assemblies for use with a swimming pool are shown in U.S. Pat. Nos. 3,072,920 granted Jan. 15, 1963 to J. I. Yellott and 3,893,443 granted July 8, 1975 to R. H. Smith. These patents disclose solar heaters which serve as covers and are adapted to float on the surface of the pool water to be covered. These patents also disclose floating solar energy collection means which allow absorbtion of sunlight through a transparent cover and also include the feature of being adjustable by adding or removing floating mats in order to control the temperature of the water. None of these assemblies, however, discloses a solar heating assembly which employs solar energy collection means having a specific gravity greater than that of water and which can take the form of a dark-colored mat positioned on the bottom of a swimming pool in order to heat the above water by convection and is rollable in order to control the temperature of the pool water.

Swimming pool cover assemblies employing an inflatable air sac are shown in U.S. Pat. Nos. 3,366,977 granted Feb. 6, 1968 to C. A. Koehler and 3,600,721 granted Aug. 24, 1971 to E. H. Pusey. The air sacs disclosed in these patents are used primarily for support of the cover means and in order to remove the cover means, it must be dragged or pulled off of the swimming pool. Swimming pool cover assemblies employing rollers in order to roll and unroll a swimming pool cover to provide easy installation and removal are shown in U.S. Pat. Nos. Re. 25,078 granted Nov. 14, 1961 to G. McGuire and 3,916,457 granted Nov. 4, 1975 to A. Morita but the rollers employed in these patents are positioned outside of the swimming pool and are not floatable in the pool with the cover rolled or unrolled. Also, none of these assemblies discloses fastening means for removably connecting the floatable roller means to the cover means nor attachment means for attaching additional floatable rollers having additional cover means.

A swimming pool cover assembly having a peripheral tubing which is filled with liquid in order to anchor the marginal portion of a swimming pool to the deck is shown in U.S. Pat. No. 2,883,676 granted Apr. 28, 1959 to J. P. Kwake but the assembly does not disclose a slack portion for allowing movement of a part of the cover means between a normal configuration and a cavity configuration, nor locking means responsive to stress in the cover means for locking the cover means in position after allowing limited movement of the cover.

Also, none of these assemblies discloses the combination of a transparent swimming pool cover coacting with solar energy collection means at the bottom of the pool.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a fragmentary cross-sectional view of a cover assembly and a solar heater assembly constructed in accordance with the instant invention and shown with a swimming pool;

FIG. 2 is a fragmentary cross-sectional view similar to FIG. 1 but showing the components in an alternative position;

FIG. 5 is an enlarged fragmentary cross-sectional view illustrating details of the locking means and slack portion constructed in accordance with the instant invention;

FIG. 6 is an enlarged fragmentary cross-sectional view similar to FIG. 5 but showing the components in an alternative position;

FIG. 7 is an enlarged fragmentary cross-sectional view illustrating an embodiment of a swimming pool cover assembly employing fastening means;

FIG. 8 is a fragmentary cross-sectional view taken substantially along line 8—8 of FIG. 7;

FIG. 9 is a fragmentary view taken substantially along line 9—9 of FIG. 7; and

FIG. 10 is a fragmentary cross-sectional view of a swimming pool cover assembly illustrating another embodiment of the instant invention.

DESCRIPTION OF THE PREFERRED EMBODIMENTS

Figure 3:
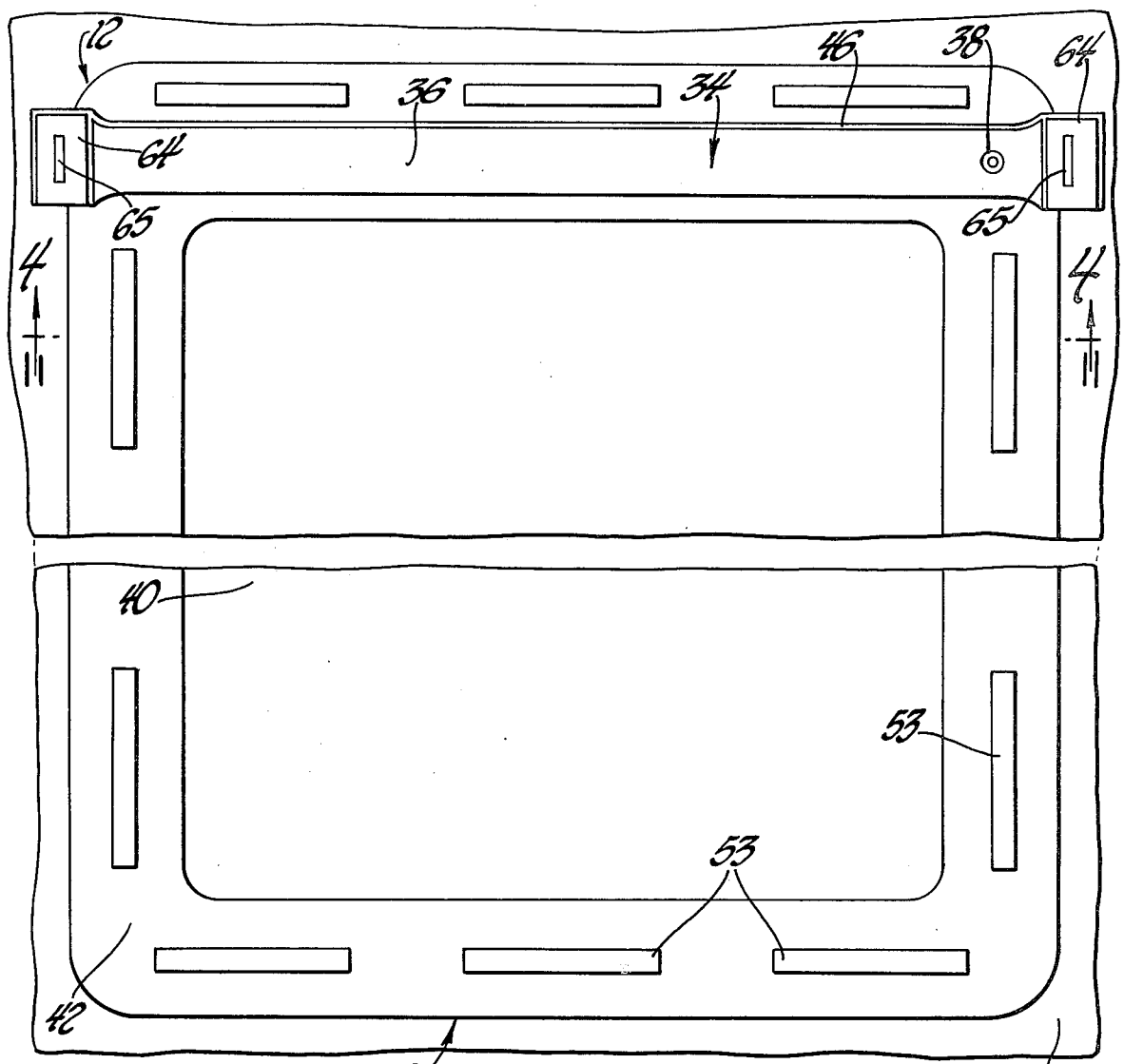
FIG. 3 is a fragmentary plan view of a cover assembly constructed in accordance with the instant invention and shown with a swimming pool.
Figure 4:
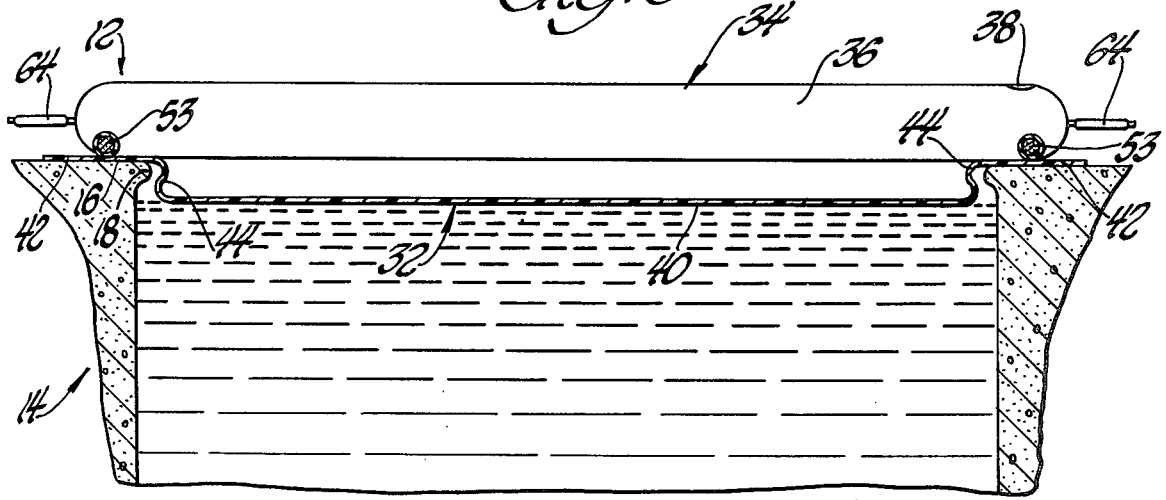
FIG. 4 is a fragmentary cross-sectional view taken substantially along line 4—4 of FIG. 3.

A swimming pool cover and solar heater is shown in FIG. 1 with the solar heating assembly generally shown at 10 and the swimming pool cover assembly generally shown at 12. The swimming pool is generally shown at 14 around which is a pool deck 16 including a coping 18 at the edge of the pool 14.

Referring to the solar heating assembly 10 as shown in FIGS. 1 and 2, the assembly 10 employs solar energy collection means which has a specific gravity greater than that of water in order to heat the water in a swimming pool. The solar energy collection means is preferably made of a dark-colored material. The solar energy collection means constructed in accordance with the instant invention has a specific gravity greater than that of water so that sunlight is absorbed below the surface of the water and, with warm water naturally rising, the pool water will be heated by convection. Thus, the pool can be heated with or without a recirculation system. In contrast, prior art floating solar energy collection means will only heat water at the top couple inches below the surface of the pool by conduction and will, therefore, require a recirculation system to distribute the heat.

The solar energy collection means may take the form of separate mats, dark-colored material sunk to the bottom of the pool, etc. In the preferred embodiment of the instant invention, the solar energy collection means includes at least one dark-colored mat 20. The specific gravity of the dark-colored mat or mats 20 is sufficiently greater than that of water in order to allow the mat 20 to sink to the bottom 22 of the swimming pool 14 and be positioned thereon.

The solar heating assembly 10 also includes control means for controlling the temperature of the water. The temperature of the water heated by solar heaters can be controlled by controlling the absorptive surface area of the solar energy collection means by adding or removing collection units. The surface area of the dark-colored mat 20 of the instant invention, however, is controlled by rolling the dark mat 20 a desired amount which will expose the light-colored bottom 22 of the pool which will absorb much less, if any, sunlight. Thus, the mat 20 is made of a pliable material and the control means includes a crossbar member 24 to facilitate rolling of the mat 20 whereby the surface area of the mat 20 may be varied in order to provide control of the temperature of the water. The dark mat 20 is shown rolled up 20' to a desired position in FIG. 2.

Still referring to the solar heating assembly 10 as shown in FIGS. 1 and 2, there are placement means for maintaining the dark-colored mat 20 in place when the mat 20 is positioned on the bottom 22 of the pool 14.

The placement means includes weighted members such as sand bags 26 or the like at various locations on the mat 20. The placement means or sand bags 26 are used to keep the dark-colored mat 20 in place and to prevent the possibility of any buoyant forces causing the mat 20 to come off of the bottom 22 whereby a person might get caught under the mat 20. In addition, since the mat 20 has suitable openings 28 in order to prevent interference with the operation of any drainage system 30 of the pool 14, the sand bags 26 prevent the mat 20 from any sliding movement which would change the relative position of any opening 28 in the mat 20 with respect to any drain 30.

From the foregoing, it is apparent that the solar heating assembly 10 allows heating of a swimming pool 14 without any interference with people swimming in the pool when the pool 14 is uncovered or partially uncovered. Thus, the solar heating assembly 10 heats without the requirement of combination with a floatable cover as is known in the art. When the solar heating assembly 10, however, is used in combination with a cover means generally indicated at 32, the cover means 32 coacts with the solar energy collections means 20 in order to retain the heat developed therefrom. When this combination is employed, the cover means 32 includes at least a portion made of material allowing solar energy to pass therethrough. In this arrangement, the cover 32 permits the short rays of the sun to pass through and be absorbed by the dark surface 20. Accordingly, the short rays are converted to heat which heats the surrounding pool water by conduction, and with warm water naturally rising, the remainder of the pool is heated by convection and the turbulence produced thereby.

Referring now to the swimming pool cover assembly 12 as constructed in accordance with the subject invention and as shown in FIGS. 1, 2, 3 and 4, cover means 32 made of pliable material for covering a swimming pool is operatively connected with at least one floatable roller means generally indicated at 34. The floatable roller means 34 is positioned adjacent an edge of the cover means 32 in order to allow rolling and unrolling of the cover means 32 between rolled and unrolled positions. The floatable roller means can be made from any material which is buoyant such as Styrofoam, cork, or the like. In the preferred embodiment of the instant invention, the floatable roller means 34 includes an inflatable air sac 36 having valve means 38 for inflation thereof. The inflatable air sac 36 has a cylindrical configuration and is rotatable about its axis and is sufficiently buoyant to support the cover means 32 in the water when the cover means 32 is in the rolled and unrolled positions and during movement therebetween.

The floatable roller means 34 also includes handle means 64 which are adapted to be gripped by a user in order to aid in rolling and unrolling the cover means 32 onto and off of the floatable roller means 34 in order to provide the rolled and unrolled positions. As shown in the drawings, the handle means 64 is formed in any well-known manner, such as a slot 65 in the material forming the air sac 36. The longitudinal bending flexibility of the roller allows rolling and rotating of the roller means 34 without stooping or kneeling, i.e., the roller may bend along its axis.

The cover means 32 includes a sheet of liquid impervious material having a predetermined configuration adapted to the pool to be covered in order to allow use of the swimming pool cover assembly 12 with swimming pools of various shapes and sizes. This sheet has a central portion 40 for covering the surface of water within a pool to be covered and a marginal portion 42 for extending over the deck 16 of the pool 14. The cover means 32 also includes a slack portion 44, which will later be described in greater detail, positioned between the central portion 40 and the marginal portion 42.

The swimming pool cover assembly 12 is shown in FIGS. 1 and 3 with the cover means 32 in the unrolled position to cover a swimming pool 14. The floatable roller means 34 is positioned on the deck 16 of the pool 14. It is understood, however, that the floatable roller means 34 could also be positioned on the surface of the water and adjacent the coping 18. Referring now to FIG. 2, the cover means 32 is shown in one of various rolled positions and the rolled-up section of the cover means 32 is generally indicated at 32'. It is apparent that when the floatable roller means 34 is rolled from left to right thereby rolling the cover means 32 thereupon, the floatable roller means 34 and the rolled-up cover means 32' could be left in the pool adjacent the coping 18, or as illustrated in FIG. 2, can be flipped over the coping 18 onto the pool deck 16 in order to provide additional pool area. It is also possible that the floatable roller means 34 could be positioned at the left of the drawing, but inside the pool 14, and by rotating the floatable roller means 34 the cover 32 will be rolled from the right of the drawing to the left. This process is similar to rolling up a window shade. In addition, it would also be possible to employ two floatable roller means 34, with one at each end of the pool.

As shown in FIGS. 1 and 2, the floatable roller means 34 or cylindrical air sac 36 is integrally formed from a portion of the cover means 32 by one of various processes known in the art, such as heat seaming at 46, or the like. In the embodiment shown in FIGS. 7, 8 and 9, fastening means is generally indicated at 48 for removably connecting the floatable roller means 34 or cylindrical air sac 36 to the cover means 32. This feature allows the replacement of the cover 32 or roller 34, without the cost of replacing both, as well as the retrofit modification of already existing pool covers. The fastening means 48 may take the form of any fastening means such as, snaps, buttons, etc. As shown in FIGS. 7, 8 and 9, the fastening means 48 includes eyelets 50 in the seamed edge of the cylindrical air sac 36 which correspond with similar eyelets 51 in the cover means 32. The cylindrical air sac 36 and the cover means 32 are connected by rope or twine 47 or the like which is wound through the eyelets 50 and 51.

Anchor means are used for securing the cover means 32 in place over the swimming pool. The anchor means are adapted to secure the marginal portion 42 of the cover means 32 on the deck 16 of the pool 14. The anchor means take the form of weighted members 53 which are typically sand bags as illustrated in the drawings, water bags, or the like.

As alluded to above, the cover means 32 includes a slack portion 44 for allowing movement of a part of the cover means 32 between a normal configuration and a cavity configuration. Referring to FIGS. 5 and 6, this feature is a safety feature in the event that a person falls on the central portion 40 of the cover 32. The cover means 32 will go from the normal configuration shown in FIG. 5 to the cavity configuration, generally indicated at 54 in FIG. 6. This cavity 54 then acts like a boat and will float the person.

Still referring to FIGS. 5 and 6, a further safety feature is provided by locking means, generally indicated at 56, responsive to stress in the cover means 32 in order to lock the cover means 32 in position after allowing limited movement, indicated by the arrow 58, of the cover means 32. The locking means 56 comprises a stop member 60 positioned adjacent the edge of the marginal portion 42 and an abutment member 62 positioned on the deck 16 of the pool 14. The stop member 60 is formed by seaming a rope into the cover means 32, but could also be any cross member such as a thickened ridge formed in the material itself, or the like.

The stop member 60 is engageable with the anchor means or weighted member 53 and the weighted member 53 is engageable with the abutment member 62 after moving a predetermined distance 58 to provide the limited movement, discussed above, of the cover means 32. Thus, if something falls on the central portion 40 of the cover means 32 and the cavity 54 is formed, additional stress may be created in the cover means 32. The limited movement 58, i.e. give, reduces this stress and, after the slack 44 and limited movement 58 is used up, the locking means 56 acts like the bolt of a lock to prevent the cover means 32 from sliding into the water. After the limited movement 58, the force required to produce further sliding of the weighted member 53 becomes several times the coefficient of friction or frictional drag which would oppose further movement if the locking means 56 were not used.

Referring to FIG. 10, attachment means generally shown at 66 are positioned on the floatable roller means 34 for allowing attachment of additional floatable roller means 68 formed from another air sac 69 and a second cover means generally indicated at 70 which includes a second central portion 72, marginal portion 74 and slack portion 76, to the first-mentioned floatable roller means 34 and its respective cover means 32. In the embodiment as shown in FIG. 10, the attachment means 66 includes a rope or cord 78 tying and connecting the handle means 64 of floatable roller 34 and second handle means 80 of floatable roller 68 together. It is understood, however, that any attachment means such as snaps, clips or the like, could be employed. This feature is particularly useful for providing a swimming pool cover for large-size pools in order to provide a swimming pool cover which is still manageable and easy to install and remove.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A solar heating assembly for use with a swimming pool comprising; solar energy collection means having a specific gravity greater than that of water for heating the water in a swimming pool, and control means for varying the absorptive capacity of said collection means to control the temperature of the water, said solar energy collection means including at least one dark-colored mat and wherein said specific gravity of said dark-colored mat is sufficiently greater than that of water to allow said mat to sink to the bottom of the swimming pool and be positioned thereon, said mat being made of a pliable material and said control means including a crossbar member to facilitate rolling of said mat whereby the surface area of the mat may be varied to provide said controlling of the temperature of the water.

2. An assembly as set forth in claim 1 including placement means for maintaining said dark-colored mat in place when said mat is in said position on the bottom of the swimming pool.

3. An assembly as set forth in claim 2 wherein said placement means includes weighted members at various locations on said mat.

4. An assembly as set forth in claim 1 wherein said cover means includes at least a portion made of material allowing solar energy to pass therethrough.

5. A swimming pool cover assembly comprising; cover means made of pliable material for covering a swimming pool, at least one floatable roller means extending generally linearly between opposite ends thereof and operatively connected with said cover means and extending between opposite edges of the perimeter of said cover means, said roller means including an inflatable air sac having a cylindrical configuration and closed ends whereby said roller means may be rotated about an axis extending between said opposite ends thereof for rolling and unrolling said cover means between rolled and unrolled positions.

6. An assembly as set forth in claim 5 including fastening means for removably connecting said floatable roller means to said cover means.

7. An assembly as set forth in claim 5 wherein said floatable roller means is integrally formed from a portion of said cover means.

8. An assembly as set forth in claim 5 including attachment means positioned on said floatable roller means for attaching additional floatable roller means and a second cover means to said first-mentioned floatable roller means.

9. An assembly as set forth in claim 5 wherein said floatable roller means includes handle means adapted to be gripped by a user for aiding in rolling and unrolling said cover means onto and off of said floatable roller means to provide said rolled and unrolled positions.

10. An assembly as set forth in claim 5 including anchor means for securing said cover means in place over the swimming pool.

11. An assembly as set forth in claim 10 wherein said anchor means includes weighted members.

12. An assembly as set forth in claim 10 wherein said cover means includes a slack portion for allowing movement of a part of said cover means between a normal configuration and a cavity configuration.

13. An assembly as set forth in claim 12 wherein said cover means includes a sheet of liquid impervious material having a predetermined configuration adapted to the pool to be covered, said sheet having a central portion for covering the surface of water within a pool to be covered, a marginal portion for extending over the deck of the pool, said anchor means being adapted to secure said marginal portion on the deck of the pool, said slack portion being positioned between said central portion and said marginal portion.

14. An assembly as set forth in claim 13 including locking means responsive to stress in the cover means for locking said cover means in position after allowing limited movement of said cover means.

15. An assembly as set forth in claim 14 including fastening means for removably connecting said floatable roller means to said cover means.

16. An assembly as set forth in claim 14 including solar energy collection means having a specific gravity greater than that of water for heating the water in the swimming pool.

17. An assembly as set forth in claim 16 including control means for controlling the temperature of the water.

18. An assembly as set forth in claim 17 wherein said solar energy collection means includes at least one dark-colored mat, said mat being positioned at the bottom of the swimming pool.

19. A swimming pool cover assembly comprising; cover means made of pliable material for covering a swimming pool, and locking means responsive to stress in said cover means for allowing limited movement of said cover means and for applying a resistance to said movement during said movement with said movement being sufficient to form a weight-supporting pocket below the surface of the surrounding water in said cover means and for locking said cover means in position after allowing said limited movement of said cover means.

20. An assembly as set forth in claim 19 wherein said locking means comprises a stop member positioned adjacent the edge of said cover means, an abutment member positioned on the deck of the pool, anchor means for securing said cover means in place over the swimming pool, said stop member being engageable with said anchor means and said anchor means being engageable with said abutment member after moving a predetermined distance to provide said limited movement of said cover means.

* * * * *